United States Patent
Salmela et al.

(10) Patent No.: US 10,931,654 B2
(45) Date of Patent: Feb. 23, 2021

(54) METHOD, NETWORK NODE AND TERMINAL DEVICE IN A COMMUNICATION NETWORK

(71) Applicant: TELEFONAKTIEBOLAGET LM ERICSSON (PUBL), Stockholm (SE)

(72) Inventors: Patrik Salmela, Jorvas (FI); Nicklas Beijar, Jorvas (FI); Domenico D'Ambrosio, Jorvas (FI); Jaime Jiménez, Jorvas (FI); Miika Komu, Jorvas (FI); Oscar Novo Diaz, Jorvas (FI); Mert Ocak, Jorvas (FI)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 200 days.

(21) Appl. No.: 15/536,244

(22) PCT Filed: Dec. 19, 2014

(86) PCT No.: PCT/EP2014/078886
§ 371 (c)(1),
(2) Date: Jun. 15, 2017

(87) PCT Pub. No.: WO2016/096055
PCT Pub. Date: Jun. 23, 2016

(65) Prior Publication Data
US 2017/0324741 A1    Nov. 9, 2017

(51) Int. Cl.
*H04L 29/06* (2006.01)
*H04W 12/08* (2021.01)
(Continued)

(52) U.S. Cl.
CPC ............ *H04L 63/08* (2013.01); *H04L 63/101* (2013.01); *H04L 63/105* (2013.01); *H04L 63/12* (2013.01);
(Continued)

(58) Field of Classification Search
None
See application file for complete search history.

(56) References Cited

U.S. PATENT DOCUMENTS

2008/0209035 A1*   8/2008   Barranco ............... H04L 67/025
                                                    709/224
2008/0271132 A1*  10/2008   Jokela ................. H04L 63/0442
                                                    726/10
(Continued)

FOREIGN PATENT DOCUMENTS

CA    2 869 505 A1    11/2013

OTHER PUBLICATIONS

Z. Shelby, The Constrained Application Protocol (CoAP), RFC 7252, Published Jun. 2014, pp. 1-113. (Year: 2014).*
(Continued)

*Primary Examiner* — Benjamin E Lanier
(74) *Attorney, Agent, or Firm* — Patent Portfolio Builders, PLLC (57) ABSTRACT

A method in a network node of a communication network configured to manage command messages from at least one Machine Type Communication, MTC, device manager intended for an MTC device, comprises receiving command messages from the at least one MTC device manager, step (201). One or more command messages are merged into an MTC device message that comprises at least one command message, step (203). Originator information is associated with each command message in the MTC device message, step (205). The MTC device message is sent to an MTC device. The network node may further perform the steps of receiving an MTC device message from an MTC device, the MTC device message comprising at least one response message, step (301). The network node determines from receiver information contained in the MTC device message which one or more MTC device managers are to receive
(Continued)

each of the at least one response message, step (303), and sends the at least one response message to each of the determined MTC device managers, step (305).

12 Claims, 5 Drawing Sheets

(51) Int. Cl.
*H04W 12/10* (2021.01)
*H04W 4/70* (2018.01)
*H04W 12/00* (2021.01)
*H04L 29/08* (2006.01)

(52) U.S. Cl.
CPC ........... *H04W 12/08* (2013.01); *H04W 12/10* (2013.01); *H04L 67/12* (2013.01); *H04W 4/70* (2018.02); *H04W 12/00502* (2019.01)

(56) References Cited

U.S. PATENT DOCUMENTS

| | | | |
|---|---|---|---|
| 2011/0213871 | A1 | 9/2011 | DiGirolamo et al. |
| 2012/0047551 | A1 | 2/2012 | Pattar et al. |
| 2013/0024556 | A1 | 1/2013 | Zhu |
| 2013/0265953 | A1* | 10/2013 | Salkintzis ............. H04W 8/186 370/329 |
| 2014/0067902 | A1 | 3/2014 | Wang et al. |
| 2016/0255580 | A1* | 9/2016 | Onaka ............... H04W 72/0446 370/311 |
| 2016/0262019 | A1* | 9/2016 | Suh ........................ H04W 12/04 |
| 2017/0086012 | A1* | 3/2017 | Jimenez .................. H04W 4/70 |
| 2017/0324741 | A1* | 11/2017 | Salmela .................. H04W 4/70 |

OTHER PUBLICATIONS

International Search Report and Written Opinion issued in Application No. PCT/EP2014/078886 dated Sep. 1, 2015, 10 pages.
Open Mobile Alliance, Ltd.: "Lightweight Machine to Machine Technical Specification", Candidate Version 1.0, Nov. 26, 2014, 112 pages.
Office Action in application No. 14818992.1; dated Apr. 12, 2019; 5 pages.

* cited by examiner

METHOD, NETWORK NODE AND TERMINAL DEVICE IN A COMMUNICATION NETWORK

CROSS REFERENCE TO RELATED APPLICATION(S)

This application is a 35 U.S.C. § 371 National Stage of International Patent Application No. PCT/EP2014/078886, filed Dec. 19, 2014, designating the United States, the disclosure of which is incorporated by reference.

TECHNICAL FIELD

The present invention relates to a method, network node and terminal device in a communication network, for example to a method, network node and terminal device relating to Machine Type Communication, MTC.

BACKGROUND

In recent years a concept known as the Internet of Things (IoT) has emerged. Generally, IoT comprises a vast number of small autonomous devices which, typically, on an infrequent basis (e.g. once per week to once per minute) transmit and receive only small amounts of data, or are polled for data. These devices are sometimes referred to as Machine Type Communication (MTC) devices, Machine-to-Machine (M2M) devices or just Machine Devices (MDs). Such devices are assumed not to be associated with humans, but are instead sensors or actuators of different kinds, which typically communicate with application servers (which configure and receive data from the devices) within or outside the cellular network.

With the nature of MTC devices and their assumed typical uses, it follows that these devices generally need to be energy efficient, since external power supplies may not necessarily be available, and since it may be either impractically or economically infeasible to frequently replace or recharge their batteries. In some scenarios the MTC devices may not even be battery powered, but may instead rely on energy harvesting, i.e. gathering energy from the environment, opportunistically utilizing (the often very limited) energy that may be tapped from sun light, temperature gradients, vibrations, etc. Sleep cycles are commonly used for the MTC devices in order to conserve power.

In view of the vast number of MTC devices envisaged in future communication networks, device management protocols are being developed and used for managing devices and their resources, for example the Open Mobile Alliance Device Management protocol (OMA DM). One such protocol is the Lightweight Machine to Machine (LWM2M) Technical Specification, Candidate Version 1.0, 10 Dec. 2013, OMA-TS-LightweightM2M-V_0-20131210-C.

The security of such management protocols is important to only allow authorized managers to manage a device, and to protect the protocol against tampering by an on-the-path attacker. Likewise, it is important that the device responsible for management (hereinafter referred to as a "device manager") can identify the device being managed ("hereinafter referred to as a "managed device"), so that the managed device can be managed correctly. This means that the device manager and managed device should be mutually authenticated with each other, and the management control plane should comprise confidentiality and/or integrity protection. In LWM2M, this is implemented as part of the standard, which states that a device manager and a managed device need to mutually authenticate with each other, and that all communication is to be encrypted.

In the internet-of-things or machine-to-machine environment, multiple constrained devices operate in different ways. As mentioned above, some devices resort to a battery as an energy source, and thus need to sleep most of the time to prolong their operational lifetime. Other MTC devices may be connected to a fixed energy source, but may have limited connectivity.

Furthermore, managed devices may have varying duty cycles, for example whereby they sleep different amounts of time while being awake at other times. In a typical way of managing such sleepy devices, a device manager sends requests to the managed devices, and expects a reply (typically immediately). However, this way of "polling" devices is no longer the standard because a managed device might not be reachable when a device manager issues a request for data. For these scenarios, and for communication with a sleepy device, it is known to provide delay-tolerant middlebox solutions, which are similar to "mailboxes". Sleepy devices can use such middleboxes to store delivered messages, such that the stored messages may then be retrieved upon awakening. For example, an entity known as a mirror server exists to fulfill one such middlebox functionality, to which a constrained managed device can store its data so that other entities can fetch the data of the managed device even when the managed device is sleeping.

Another aspect relating to the management of MTC devices is that multiple managers might be managing the same device. In the mailbox type of approach, management commands from different managers can be stored in the mailbox of a sleepy device. When the managed device wakes up, it fetches messages from all the managers at once and then acts on the management requests. However, this is not the optimal solution because multiple managers can give the same or contradictory commands, which means that a sleepy device can often fetch redundant messages and perform unnecessary actions (e.g. changing a value from 0 to 1, and again back to 0). This has a disadvantage of consuming the resources of a constrained device, both in terms of the unnecessary communication and the unnecessary processing of duplicate or contradictory commands.

Another problem when using middleboxes is that relating to the provision of security, confidentiality or integrity between device managers and managed devices.

SUMMARY

It is an aim of the present invention to provide a method and apparatus which obviate or reduce at least one or more of the disadvantages mentioned above.

According to a first aspect of the present invention there is provided a method in a network node of a communication network configured to manage command messages from at least one Machine Type Communication, MTC, device manager intended for an MTC device. The method comprises receiving command messages from the at least one MTC device manager. The one or more command messages are merged into an MTC device message that comprises at least one command message. The method comprises associating originator information with each command message in the MTC device message, and sending the MTC device message to an MTC device.

By associating originator information with each command message in the MTC device message, this has the advantage of passing access control to an MTC device, rather than relying on another network node to perform access control, for example rather than relying on a middlebox that performs the merging of commands.

According to another aspect of the present invention there is provided a method in a network node of a communication network configured to manage messages from a Machine Type Communication, MTC, device intended for at least one MTC device manager. The method comprises receiving an MTC device message from an MTC device, the MTC device message comprising at least one response message. The method comprises determining from receiver information contained in the MTC device message which one or more MTC device managers are to receive each of the at least one response message. The at least one response message is sent to each of the determined MTC device managers.

This has an advantage in that, as above, a managed device (MTC device) has control over access to itself, and which MTC device managers receive information from the MTC device, since it is the MTC device which associates receiver information with each response message of a returned MTC device message, such that a network node performing the method above can receive such an MTC device message and route the one or more response messages contained therein to the authorised device manager(s).

According to another aspect of the present invention there is provided a network node for a communication network configured to manage command messages from at least one Machine Type Communication, MTC, device manager intended for an MTC device. The network node comprises a receiving module adapted to receive command messages from the at least one MTC device manager. The network node comprises a processing module adapted to merge one or more command messages into at least one MTC device message that comprises at least one command message, and associate originator information with each command message in the MTC device message. A sending module is adapted to send the MTC device message to an MTC device.

According to another aspect of the present invention, there is provided a network node for a communication network configured to manage messages from a Machine Type Communication, MTC, device intended for at least one MTC device manager. The network node comprises a receiving module adapted to receive an MTC device message from an MTC device, the MTC device message comprising at least one response message. The network node comprises a processing module adapted to determine from receiver information contained in the MTC device message which one or more MTC device managers are to receive each of the at least one response message. A sending module is adapted to send the one or more response messages to each of the determined MTC device managers.

According to another aspect of the present invention, there is provided a Machine Type Communication, MTC, device for use in a communication network configured to manage messages between at least one MTC device and at least one MTC device manager. The MTC device comprises a receiving module adapted to receive an MTC device message from a network node, the MTC device message comprising at least one command message from at least one MTC device manager, the at least one command message having originator information associated therewith. The MTC device comprises a processing module adapted to determine from the originator information whether a command message is from at least one authorised MTC device manager, and if so perform the command message.

According to another aspect of the present invention, there is provided a Machine Type Communication, MTC, device manager for use in a communication network configured to manage messages between at least one MTC device manager and at least one MTC device via an intermediate node. The MTC device manager comprises a processing module adapted to associate originator information and authenticator information with a command message, and a sending module adapted to send the command message comprising the originator information and the authenticator information to an intermediate node.

According to another aspect of the present invention, there is provided a computer program, comprising instructions which, when executed on at least one processor, causes the at least one processor to carry out the method according to any one of the appended claims.

According to another aspect of the present invention, there is provided a carrier comprising such a computer program, wherein the carrier is one of an electronic signal, optical signal, radio signal or computer readable storage medium.

According to another aspect of the present invention, there is provided a network node for a communication network configured to manage command messages from at least one Machine Type Communication, MTC, device manager intended for an MTC device. The network node comprises a processor, and a memory containing instructions executable by said processor. The network node is operative to: receive command messages from the at least one MTC device manager; merge one or more command messages into an MTC device message that comprises at least one command message; associate originator information with each command message in the MTC device message; and send the MTC device message to an MTC device.

According to another aspect of the present invention, there is provided a Machine Type Communication, MTC, device for use in a communication network configured to manage messages between at least one MTC device and at least one MTC device manager. The MTC device comprises a processor, and a memory containing instructions executable by said processor. The MTC device is operative to: receive an MTC device message from a network node, the MTC device message comprising at least one command message from at least one MTC device manager, and the at least one command message having originator information associated therewith; and determine from the originator information whether a command message is from at least one authorised MTC device manager, and if so perform the command message.

According to another aspect of the present invention, there is provided a Machine Type Communication, MTC, device manager for use in a communication network configured to manage messages between at least one MTC device manager and at least one MTC device via an intermediate node. The MTC device manager comprises a processor, and a memory containing instructions executable by said processor. The MTC device manager is operative to: associate originator information and authenticator information with a command message; and send the command message comprising the originator information and the authenticator information to an intermediate node.

BRIEF DESCRIPTION OF THE DRAWINGS

For a better understanding of examples of the present invention, and to show more clearly how the examples may be carried into effect, reference will now be made, by way of example only, to the following drawings in which.

DETAILED DESCRIPTION

In the embodiments described below references will be made to Machine Type Communication, MTC, and to MTC devices and MTC device managers. It is noted that such references are intended to embrace other terms used to describe such devices and nodes, for example Machine-to-Machine, M2M, devices or Machine Devices, MD.

As mentioned in the background section, it is known to provide middleboxes between device managers and managed devices, but that such systems may have disadvantages whereby multiple managers can give the same or contradictory commands, which means that a managed device can often fetch redundant messages and perform unnecessary actions.

To solve this problem, a merging management proxy has been proposed by the present Applicant in patent application PCT/SE2014/050668, which makes intelligent decisions on how to merge the commands from multiple managers, for example to assign the least amount of work to a constrained device. In such a system a merging proxy node acts as a management client towards the device managers and as a device manager towards the constrained managed devices.

Figure 1:
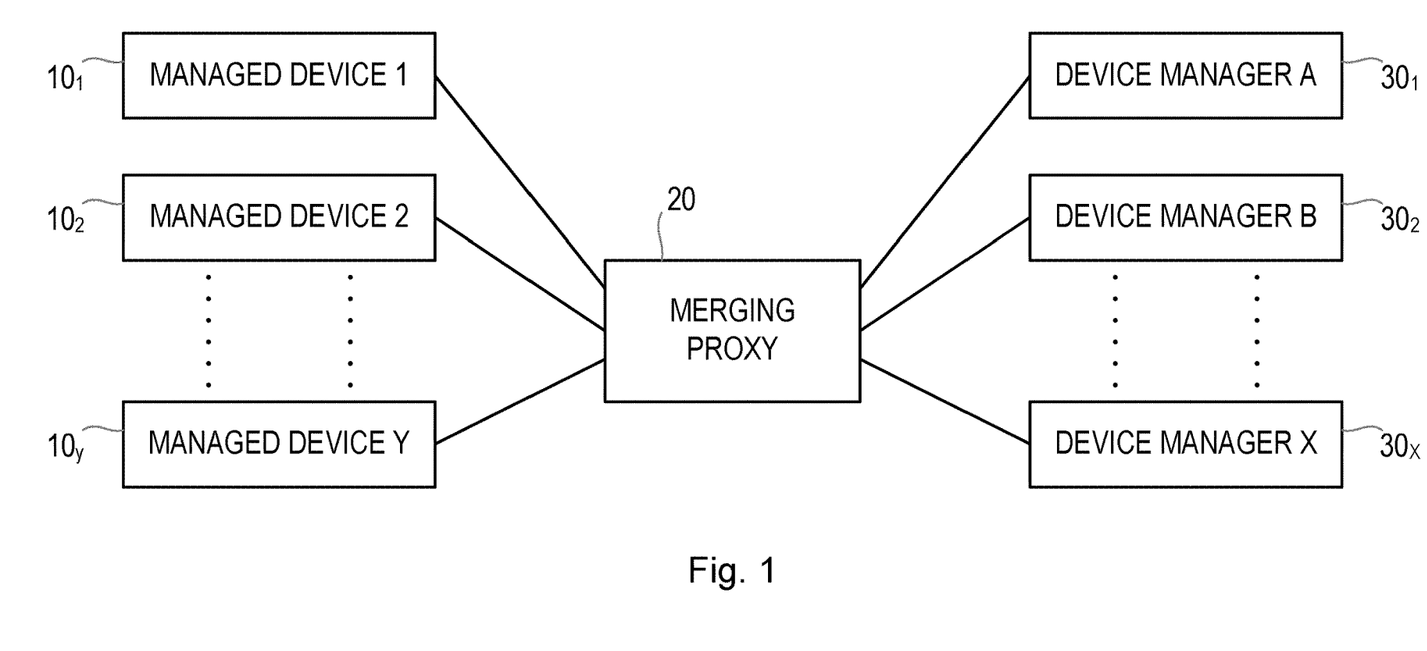
FIG. 1 shows an example of a machine type communication, MTC, network.

FIG. 1 shows an example of such a system, whereby a network node 20 configured as a merging proxy node acts as a middlebox between one or more device managers $30_1$ to $30_X$ and one or more managed devices $10_1$ to $10_Y$.

When implementing a merging management proxy such as that shown in FIG. 1, the merging proxy node 20 collects the management commands of the device managers 30 of a particular managed device 10, and presents the managed device 10 with a merged set of commands that fulfills the requirements of all the managers. It may be the case that one device manager 30 has higher priority than other device managers and, thus, may invalidate a command by some other device manager. The merging proxy node 20 then communicates this merged set of commands to the managed device 10 for processing. However, as the commands are merged at the proxy, this means that the confidentiality and/or integrity protection of the original management commands needs to be broken. The merging proxy node 20 creates a completely new command (or a set of commands) which may no longer resemble the original one. For intelligent merging, the merging proxy node 20 needs to act as a managed device on behalf of the actual managed device, i.e. the device managers issue the commands to the proxy instead of the actual managed device. As the communication between the device manager and managed device is protected, this also means that the communication is protected between the device managers and the merging proxy node 20. Correspondingly, the merging proxy node 20 then decrypts the messages from device managers, i.e. breaks the security chain, and merges the commands.

When the merging proxy node 20 sends this new set of commands to the managed device, after the merging proxy node has terminated the secure communication, the managed device cannot identify and authenticate the device manager issuing a command, and the managed device cannot verify that the manager is authorized to perform the action it has requested. Furthermore, multiple managers may have requested to, e.g. read a certain value of the device, but the merged command set appears as a single read from a single device manager. In other words, the managed device is not able to identify the actual device managers that should receive the response.

In the system of FIG. 1, the merging proxy node therefore takes responsibility for access control, whereby the merging proxy node 20 is assigned a full set of access rights that all device managers of a managed device have in total. As an example, let us consider that device manager A (301) has read access to a resource Z while device manager B (302) does not have read access. In such a case, the merging proxy node 20 also needs to have read access to resource Z to be able to fulfill the requests of device manager A. At the same time, the merging proxy node 20 needs to be aware that it must not pass read results of resource Z to device manager B, i.e. because device manager B is not authorized to have access to resource Z.

A disadvantage of this is that the merging proxy node 20 needs to maintain access control information about the managed devices that the merging proxy node 20 is serving. Another disadvantage is that a managed device must place its trust in a merging proxy node 20, since it is the merging proxy node 20 which controls security between device managers and managed devices, and vice versa.

The embodiments of the present invention, as described herein, propose a solution whereby a management protocol (or protocols) is enhanced to support a merging proxy scenario as described above, but also whereby access control is passed to a managed device.

Figure 2:
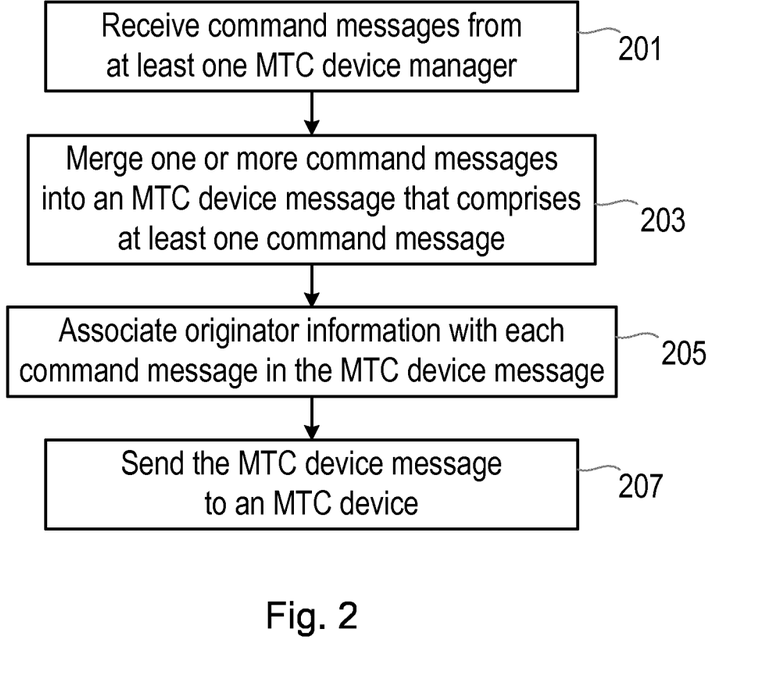
FIG. 2 shows an example of a method in a network node, according to an embodiment of the present invention.

According to an embodiment of the present invention, FIG. 2 shows an example of a method in a network node of a communication network configured to manage command messages from at least one Machine Type Communication, MTC, device manager intended for an MTC device. The network node may comprise, for example, a merging proxy node as described above. The method comprises receiving command messages from the at least one MTC device manager, step 201. One or more command messages are merged into an MTC device message that comprises at least one command message step 203. Originator information is associated with each command message in the MTC device message, step 205. The MTC device message is then sent to an MTC device, step 207.

By adding originator information into the merged MTC device message, this has an advantage of enabling a managed device to perform access control on the side of the managed device, i.e. based on information about which device manager(s), originator(s)), has issued a command, rather than relying on the network node (e.g. merging proxy node) having to maintain and police the access control.

In one example the merging step may result in an MTC device message comprising a separate command message (for example separate different commands) from a plurality of separate device managers, such that the MTC device message comprises a plurality of command messages, each associated with at least one device manager. In another example, the merging step may result in fewer command messages than commands issued by device managers, for example where the same command is issued by more than one device manager, with the multiple same commands then being replaced by a single command.

Therefore, each command message in the MTC device message can have just one device manager associated with it, or multiple device managers associated with it. An MTC device message may comprise any combination thereof, i.e. any combination of command messages.

It is noted that the step of merging might also end up with just one command message, with just one device manager associated with it (i.e. because just one device manager issued that one command). This still has a benefit of providing the identity of that device manager to the managed device, such that the managed device can still perform access control when using a proxy type system. When more than one originator is associated with the same command, then an added benefit is that the command is only sent once (and possibly with more than one different command, all commands merged into one MTC device message).

Therefore, in one embodiment the originator information comprises information for identifying each MTC device manager that has issued a command message that forms part of the MTC device message. The originator information therefore identifies which particular device manager(s) have issued that particular command message.

Below is an example of a message that may be sent from an MTC device manager A to a network node (such as a merging proxy node), and the MTC device message that may then be sent from the network node to an MTC device (for example Device D). In the example it is assumed that a hacker, EvilHacker, has also sent the same command intended for Device D:

Device Manager A to Merging Proxy

Resource: DeviceD
Command: Read Meaning_of_life
Issuer: ManagerA

Merging Proxy to Device D

Command: Read Meaning_of_life
Issuer: Merging proxy
Originator: ManagerA, EvilHacker The part shown in bold comprises the originator information that is added by the network node to identify the device manager(s) that is associated with each command, in this example identifying that the issuers of the command are Manager A and EvilHacker. As will be described later in the application, a managed device, Device D in this example, is then able to control access to its resources using this originator information. For example, when the managed device, Device D, parses the command sent by the network node (Merging proxy), Device D will notice that Manager A is allowed to read Meaning_of_life while EvilHacker is not allowed. Since at least one device manager is allowed to perform that command, the Device D will perform the command, but in the corresponding response message Device D will indicate that only Manager A is authorised to receive the response to that command. Further details about the steps performed at a managed device will be described later in the application.

In one embodiment the method further comprises the step of adding authenticator information to the MTC device message, wherein the authenticator information is for use in authenticating an MTC device manager that has issued a command message that forms part of the MTC device message. Such an embodiment has an advantage, for example, in a system where the network node itself (e.g. merging proxy node) may not be fully trusted. The use of the authenticator information therefore provides an extra level of security. The authenticator information may be received from an MTC device manager with a command message, prior to that command message being merged into the MTC device message. The use of an authenticator part can be a configuration/administrative decision.

The authenticator information may comprise, for example, a keyed hash or a digital signature associated with an MTC device manager, or some other form of authentication. If the authenticator is just a signature without binding it to the current transaction, the merging proxy could store the authenticator and re-use it for other commands. Therefore, according to one embodiment the authenticator information may include both the command and some transaction specific data (for example a timestamp, sequence number etc.) which makes re-using the authenticator information impossible Therefore, depending on the level of trust in the network node which provides a merging proxy function, in some embodiments the device managers include in the initial management command an authenticator of the command they have issued, which the network node (proxy) can then include in the command sent to the MTC device, together with the identity of the device manager (i.e. originator information). The managed MTC device is then able to calculate the same signature (or otherwise verify the authenticator) from the information it receives from the network node (proxy). In this way a managed device is able to securely verify that an authorized device manager has issued the command.

Below in an example of a message that may be sent from an MTC device manager A to a network node (such as a merging proxy node), and the MTC device message that may then be sent from the network node to an MTC device (Device D), when using such authentication. As before, it is assumed that a hacker is also attempting to issue a command to Device D:

Device Manager A to Merging Proxy

Resource: DeviceD
Command: Read Meaning_of_life
Issuer: ManagerA
Authenticator:hash_keyed("Read Meaning_of_life", keyA)

Merging Proxy to Device D

Command: Read Meaning_of_life
Issuer: Merging proxy
Originator: ManagerA, EvilHacker
Authenticator:hash_keyed("Read Meaning_of_life", keyA),hash_keyed("Read Meaning_of_life", keyEH)

In one example, a management command is issued by a device manager to a network node (proxy) after the two have mutually authenticated each other and established a secured communication channel. This enables the network node to know that the received command is issued by an identified and authenticated device manager. The network node will know that it serves a managed device, and any device manager could potentially try to connect and send management commands. The network node forwards the commands to the managed device, which verifies that the device manager is authorized to perform said action.

In an embodiment where the network node knows which device managers are allowed to communicate with a managed device, and for example has no other information about access rights, then the network node may be able to verify that the command is from a manager that is allowed to perform the issued command.

In one embodiment the network node is able to authenticate a device manager prior to merging that command and associating originator information with that command. In this case, a managed device can find the manager identity from the originator information and find the matching key to use for verifying the authenticator based on the information provided. Using the key, a managed device can recalculate (or otherwise verify) the authenticator and check that it matches the authenticator found in the received message. In one example the device manager and a managed device have a shared secret key. If this is not the case, then a device manager can create a digital signature (instead of a keyed hash) using its private key (of an asymmetric key pair) and the managed device can verify the signature using the public key of the device manager. Other forms of authentication may also be used. The originator information and authenticator information are linked in the messages, so that if there are multiple originators, a device can easily find the matching authenticator.

In the example above, Device D will find a matching authentication for device manager A, but not for the hacker. Device D, upon processing the command, will only include device manager A in the receiver information associated with the response message to that command. For example, an access control list will recognize that manager A is allowed to perform said command while EvilHacker is not. Furthermore, the authenticator of manager A is verified, after which the command is executed and the reply sent only to manager A Next, there will be described an example of the steps performed in a network node when messages are flowing in the direction from a managed device to one or more device managers.

Figure 3:
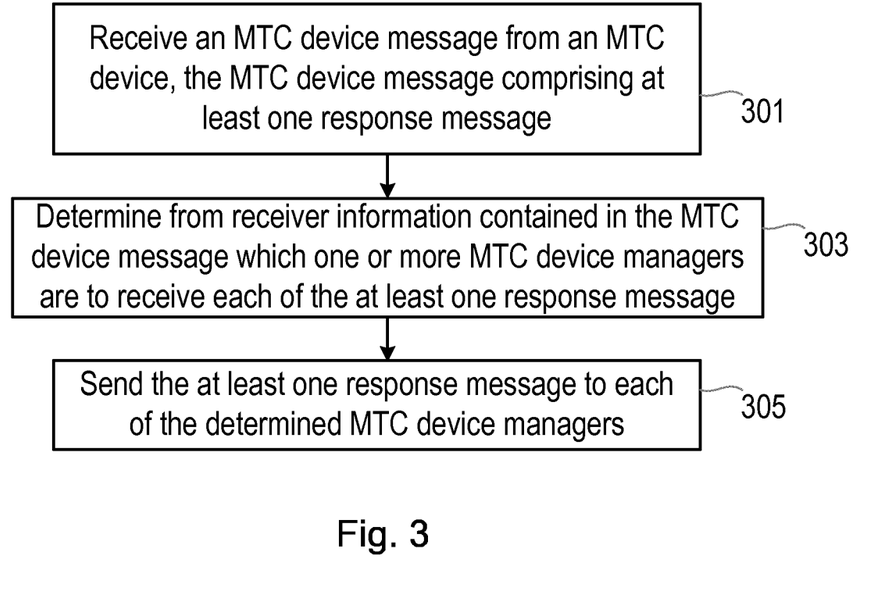
FIG. 3 shows an example of a method in a network node, according to an embodiment of the present invention.

FIG. 3 shows an example of the steps performed by an embodiment of the invention, and in particular to a method in a network node of a communication network configured to manage messages from a Machine Type Communication, MTC, device intended for at least one MTC device manager.

The method comprises receiving an MTC device message from an MTC device, the MTC device message comprising at least one response message, step 301. The method comprises determining from receiver information contained in the MTC device message which one or more MTC device managers are to receive each of the at least one response message, step 303. The at least one response message is then sent to each of the determined MTC device managers, step 305.

Thus, according to this embodiment, the method takes receiver information contained in the received MTC device message, and uses this information to determine which MTC device managers are entitled to receive that response. As will be described later, since the managed device is in control of access, the managed device will control which receiver information is associated with each response message. As such, the network node is able to simply determine from the received MTC device message which device manager or device managers are intended to receive each response message in the received MTC device message, and send each response message to the corresponding device manager(s).

It is noted that an MTC device message from a managed device might end up with just one response message, with just one device manager associated with it. This still has a benefit of providing the identity of that device manager to the network node, so that the network node can then forward that response without necessarily having to perform any added security. An MTC device message from a managed device might contain a response message intended for multiple device managers, for example where multiple managers have issued the same command message to trigger such a response message. An MTC device message may also contain a mixture of response messages, whereby some are intended for a single device manager, and some for multiple device managers.

Thus, in one embodiment the receiver information contains the identity of each MTC device manager which is authorised to receive a particular response message.

Below is an example of an MTC device message that may be sent from an MTC device (for example Device D) to a network node (such as a merging proxy node), and a response message that may then be sent from the network node to an MTC device manager (for example Device Manager A):

Device D to Merging Proxy

Result:42
Issuer:DeviceD
Receiver:ManagerA
Merging Proxy to Device Manager A
Result:42
Issuer:DeviceD From the above it can be seen that, since Device D is only allowed access to Manager A, the response message containing "Result: 42" has receiver information associated with it, "Receiver:ManagerA", which indicates that only Manager A is authorised to receive this response message. The receiver information does not make any reference to EvilHacker.

The MTC device message may further comprise authenticator information relating to each MTC device manager that is identified as being authorised to receive a response message.

In one example, the receiver information may comprise an identity that can be strongly authenticated (e.g. public key (or derivative of public key) of device manager), but in other example there may not be any need for the device to provide explicit authenticator information of/for the device managers. The response message is in any case linked to a request issued by an authenticated device manager, so the network node (proxy) can send the response message to the same device manager. It is noted that the authenticator information the MTC device can add to the response message may be more concerned with authenticating the MTC device, or that the MTC device has issued the response. This can be, for example, a similar authenticator as the device managers add for the commands, or the authenticator could be in the form of the MTC device encrypting the response message with the public key of the device manager, making the response shielded from everyone except the intended receiving device manager. Such an embodiment requires the MTC device to individually encrypt the response for each device manager (for example if all require this form of security), in which case a response message may be sent multiple times in the one MTC device message, but encrypted by different keys.

In one embodiment the method may comprise authenticating an MTC device manager prior to forwarding a response message to that MTC device manager.

Below is an example of an MTC device message that may be sent from an MTC device (for example Device D) to a network node (such as a merging proxy node) when using such authenticator information, and a response message that may then be sent from the network node to an MTC device manager (for example device manager A):

Device D to Merging Proxy

Result:42
Issuer:DeviceD
Receiver:ManagerA
Authenticator: hash_keyed("42", keyD)

Merging Proxy to Device Manager A

Result:42
Issuer:DeviceD
Authenticator: hash_keyed("42", keyD)

As before, this has an advantage in that, if the network node (e.g. merging proxy node) cannot be fully trusted, the use of the authenticator information provides an additional level of security. The authenticator information is for the MTC device, and links a response message to that MTC device that has provided the response. This provides protection against the network node modifying a response message sent by the MTC device so that a device manager receives a different response than was actually issued by the MTC device.

The method may further comprise comparing receiver information received with a response message with originator information sent in a previous corresponding command message. In the event that a command originating from a particular MTC device manager does not receive a corresponding response message for that particular MTC device manager, a failure message can be sent to that MTC device manager. In such an embodiment the network node may be adapted to store information relating to which command messages or requests have been received and issued to an MTC device, and to check these with response messages received from an MTC device. This provides a monitoring function, whereby the network node may keep track of which command messages are awaiting a response. In the event that no response message is received for a particular device manager, a failure message may then be sent to that device manager, for example an error message to the device manager, saying that the device manager is not authorized.

Alternatively, in the event that a command originating from a particular MTC device manager does not receive a corresponding response message for that particular MTC device manager, according to another embodiment no action is taken by the network node. In other words, in this embodiment the network node simply assumes that the particular device manager was not authorised to make such a request to that particular MTC device, and therefore assumes that the failure to receive any receiver information for that device manager is confirmation of this (and as a result no response is sent to that device manager).

In another example, for protecting against a non-trusted network node from sharing response messages with unauthorized device manager, a MTC device may be adapted to encrypt the response messages for each receiving device manager individually, and indicate which encrypted response message is intended for which device manager. In this way, only the intended receiving device manager will be able to decrypt and interpret the response.

Figure 4:
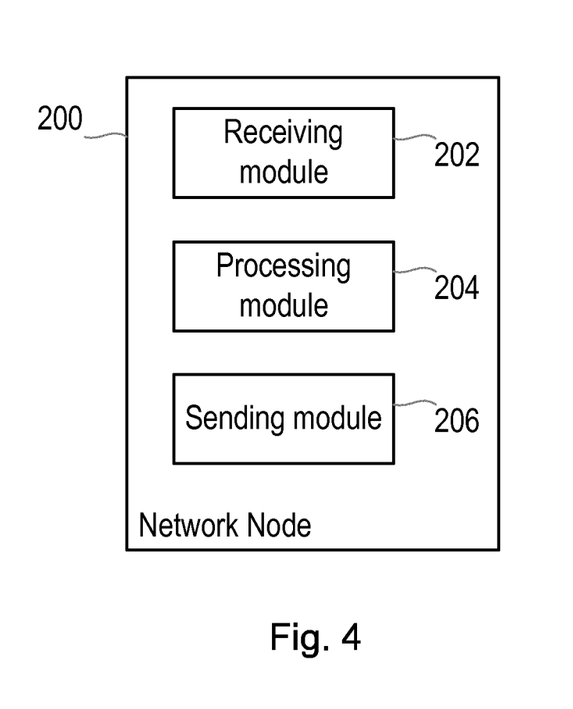
FIG. 4 shows an example of a network node according to an embodiment of the present invention.

FIG. 4 shows an example of a network node 200, for example a merging proxy node, according to another embodiment, for a communication network configured to manage command messages from at least one Machine Type Communication, MTC, device manager intended for an MTC device. The network node comprises a receiving module 202 adapted to receive command messages from the at least one MTC device manager. A processing module 204 is adapted to merge one or more command messages into at least one MTC device message that comprises at least one command message. The processing module 204 is further adapted to associate originator information with each command message in the MTC device message. A sending module 206 is adapted to send the MTC device message to an MTC device.

When handling or managing messages in the other direction, i.e. from a Machine Type Communication, MTC, device intended for at least one MTC device manager, the receiving module 202 is adapted to receive an MTC device message from an MTC device, the MTC device message comprising at least one response message. The processing module 204 is adapted to determine from receiver information contained in the MTC device message which one or more MTC device managers are to receive each of the at least one response message. The sending module 206 is adapted to send the one or more response messages to each of the determined MTC device managers.

The embodiments above are concerned with a network node, for example a middlebox between device managers and managed device. Next, there will be described embodiments relating to a managed device itself.

Figure 5:
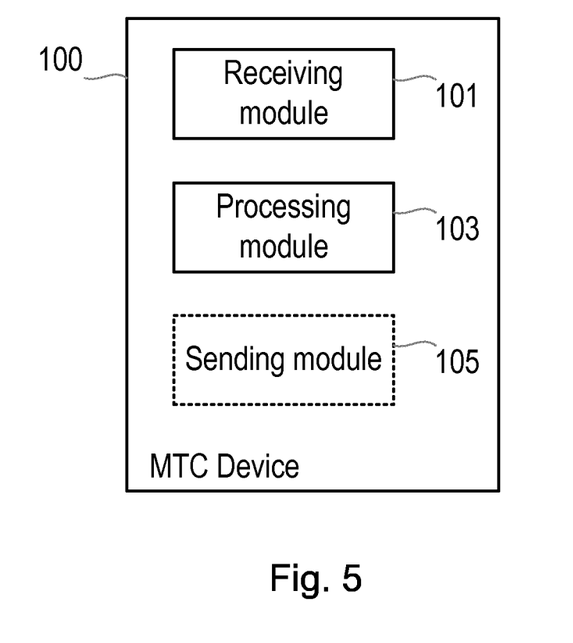
FIG. 5 shows an example of an MTC device according to an embodiment of the present invention.

FIG. 5 shows an example of an MTC device 100, or a managed device, according to an embodiment of the present invention. The MTC device 100 is for use in a communication network configured to manage messages between at least one MTC device and at least one MTC device manager. The MTC device 100 comprises a receiving module 101 adapted to receive an MTC device message from a network node. The MTC device message comprises at least one command message from at least one MTC device manager, the at least one command message having originator information associated therewith. A processing module 103 is adapted to determine from the originator information whether a command message is from at least one authorised MTC device manager, and if so perform the command message.

This has an advantage in that a managed device only performs a command message if that command message is from at least one authorised device manager. In a scenario where each of the merged command messages only has one device manager associated with it, this is a simple yes/no form of access control for each command. In another scenario a particular command message in the MTC device message may have multiple MTC device managers associated with it, including the possibility that at least one of which is unauthorised, e.g. EvilHacker in the examples above. In such a scenario the MTC device will still perform that command provided that at least one MTC device manager is authorised, but will only associate the authorised MTC device manager(s) in a corresponding response message returned to the network node.

Thus, the processing module 103 may be further adapted to associate receiver information with a response message, after processing the command message, for indicating which one or more MTC device managers are authorised to receive the response message.

In an embodiment where the originator information for a command message indicates that multiple MTC device managers are associated with that command message, the processing module 103 may be adapted, after performing the command message, to associate only the receiver information of authorised MTC device managers in a response message. The processing module 103 may be adapted to first check that at least one device manager is allowed to request the command, before performing that command.

In one example, the received MTC device message may further comprise authenticator information. In such an embodiment the processing module 103 may be adapted to use the originator information of an MTC device manager to obtain authenticator information for that MTC device manager (which may be stored locally, for example, or in another network node). Using the obtained authenticator information, the processing module 103 is adapted to verify the authenticator information received with the MTC device message. The command message may then be performed only if the verification is successful.

As above, the use of authenticator information is advantageous if the network node (proxy node) cannot be fully trusted, since the authenticator information provides an extra level of security.

Figure 6:
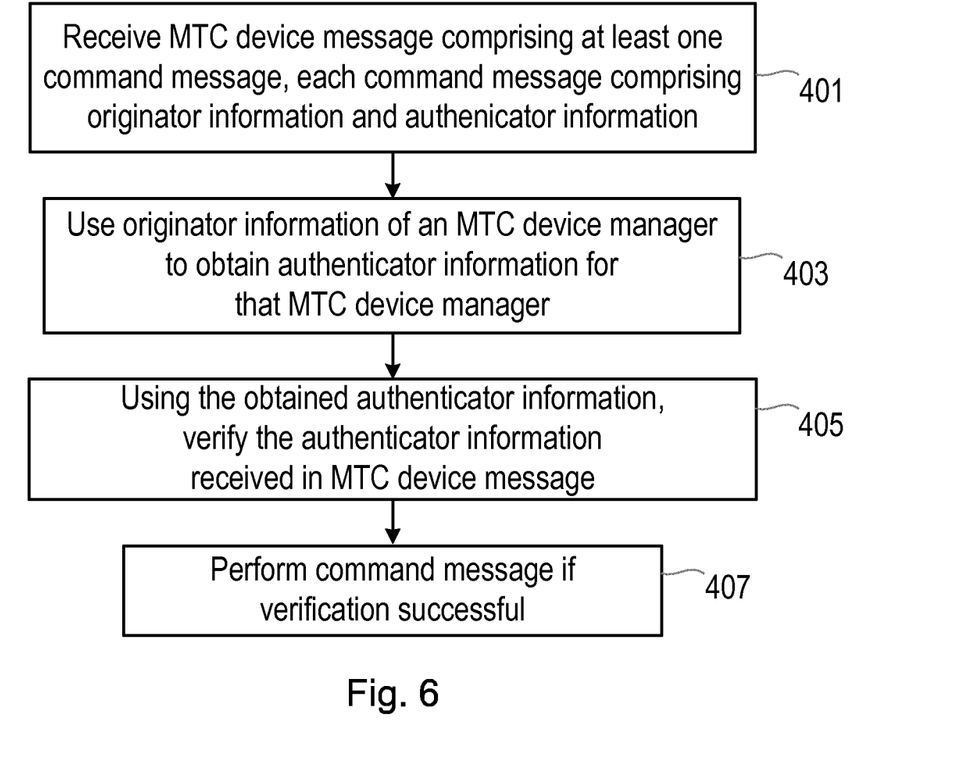
FIG. 6 shows an example of a method in an MTC device, according to an embodiment of the present invention.

FIG. 6 shows a method that may be performed in an MTC device, according to an embodiment of the present invention. The method comprises receiving an MTC device message comprising at least one command message, each of the at least one command messages comprising originator information and authenticator information, step 401. Next, originator information of an MTC device manager is used to obtain authenticator information for that MTC device manager, step 403. Using the obtained authenticator information, verification of the authenticator information received in the MTC device message is performed, step 405. A command is performed if the verification is successful, step 407.

An MTC device effectively performs two tasks. The MTC device checks if the device manager is authorized to perform said command. This may be performed, for example, based on local policy/access control lists. Also, the MTC device checks if the message is actually sent by the device manager claimed, i.e. verifying the authenticator information. These may be performed in any order, although performing the former first can be advantageous, since if the device manager is not authorized to perform an action, then there is no point in checking the authenticator as it will bring no added value to the decision.

As stated in previous embodiments, however, the method performed in the MTC device need not necessarily involve verification of authentication information, and in some embodiments may merely rely instead on just originator information to decide whether or not to perform a command.

Figure 7:
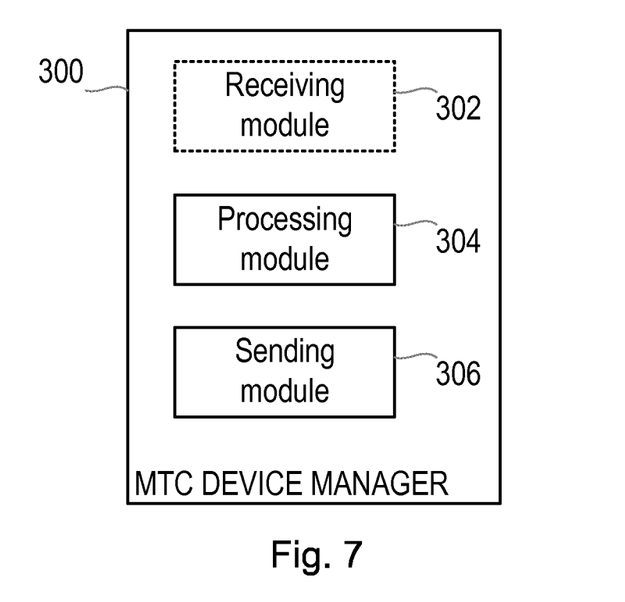
FIG. 7 shows an example of an MTC device manager according to an embodiment of the present invention.

FIG. 7 shows an example of an MTC device manager 300 according to another embodiment of the present invention, for use in a communication network configured to manage messages between at least one MTC device manager and at least one MTC device via an intermediate node (the intermediate node being, for example, a merging proxy node). The MTC device manager 300 comprises a processing module 304 adapted to associate originator information and authenticator information with a command message, and a sending module 306 adapted to send the command message comprising the originator information and the authenticator information to an intermediate node.

The authenticator information enables a managed device to authenticate a device manager, i.e. the sender of a command. In some embodiments, the authenticator information may also enable an intermediate network node (proxy) to authenticate which device manager a command message is received from, such that the originator information is only associated with authenticated device managers. For example, a proxy can verify that the originator information matches the mutually authenticated peer from which the command was received. This can protect against a device manager issuing a command on behalf of some other manager (for example in a scenario where a device manager has somehow acquired the secret/authentication information of the other device manager for which it is issuing commands). If a network node (proxy node) cannot be fully trusted, the use of the authenticator information from the device manager provides an extra level of security.

In one example, the processing module 304 may be adapted to associate authenticator information with a command message such that the authenticator information varies over time, or is cyclic, or includes a nonce, or is random, or includes a timestamp. This has the advantage of preventing the network node from re-using authenticator information from a previous command with a new command.

Figure 8:
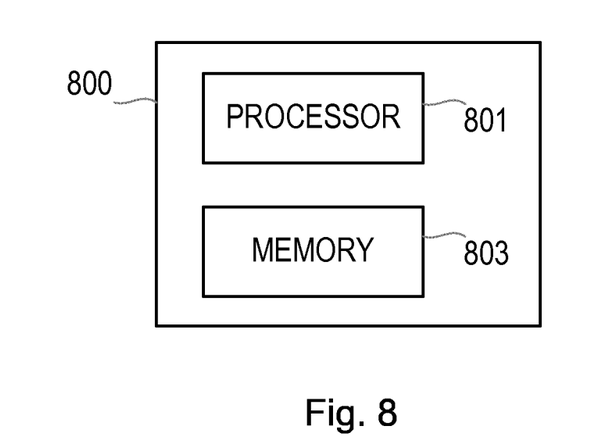
FIG. 8 shows an example of a network node, according to an embodiment of the present invention.

FIG. 8 shows an example of a network node 800 according to an embodiment of the present invention, for a communication network configured to manage command messages from at least one Machine Type Communication, MTC, device manager intended for an MTC device. The network node 800 comprises a processor 801, and a memory 803 containing instructions executable by said processor 801. The network node 800 is operative to: receive command messages from the at least one MTC device manager step 201; merge one or more command messages into an MTC device message that comprises at least one command message step 203; associate originator information with each command message in the MTC device message step 205; and send the MTC device message to an MTC device step 207.

Figure 9:
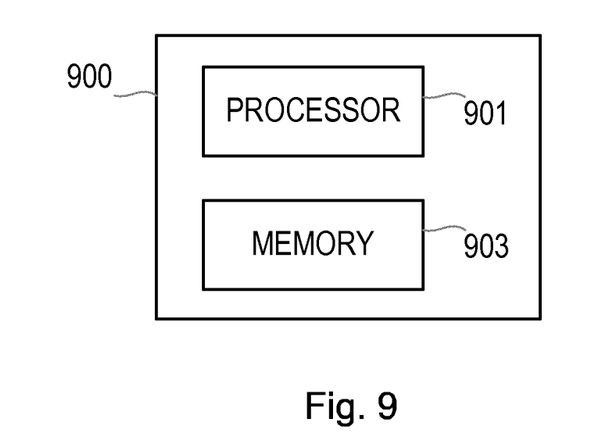
FIG. 9 shows an example of an MTC device according to an embodiment of the present invention.

FIG. 9 shows an example of a Machine Type Communication, MTC, device 900 according to an embodiment of the invention, for use in a communication network configured to manage messages between at least one MTC device and at least one MTC device manager. The MTC device 900 comprises a processor 901, and a memory 903 containing instructions executable by said processor 901, whereby the MTC device 900 is operative to: receive an MTC device message from a network node, the MTC device message comprising at least one command message from at least one MTC device manager, and the at least one command message having originator information associated therewith; and determine from the originator information whether a command message is from at least one authorised MTC device manager, and if so perform the command message.

Figure 10:
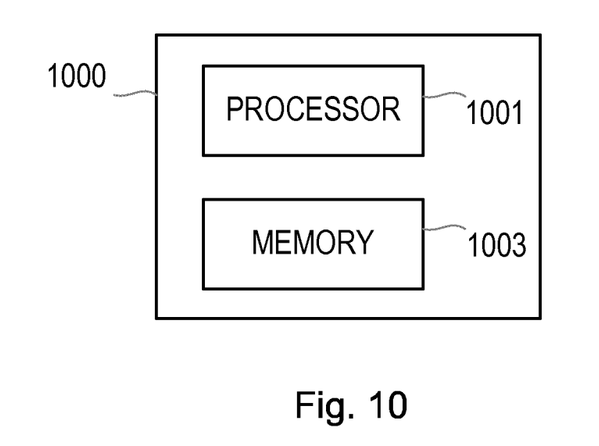
FIG. 10 shows an example of an MTC device manager according to an embodiment of the present invention.

FIG. 10 shows an example of a Machine Type Communication, MTC, device manager 1000, according to an embodiment of the present invention, for use in a communication network configured to manage messages between at least one MTC device manager and at least one MTC device via an intermediate node. The MTC device manager 1000 comprises a processor 1001, and a memory 1003 containing instructions executable by said processor 1001, whereby the MTC device manager 1000 is operative to: associate originator information and authenticator information with a command message; and send the command message comprising the originator information and the authenticator information to an intermediate node.

The embodiments above have the advantage of enabling a managed device to perform access control on commands received from a network node which acts as a middlebox between the managed device and a plurality of device managers, whereby the network node adds information about which manager has issued which command into a merged set of commands that the network node sends to the managed device. Then the managed device can perform access control on all received messages and reply to the network node with the results. In the case where multiple device managers want to perform the same management action, e.g., read value X, the network node can include in the management command "read value X" and the identities (originator information) of all managers that have issued the command. Likewise, the response from the managed device can contain an indication about which (if not all) managers are allowed to receive the response, since different managers might have different access rights to the resources of the managed device.

In some embodiments described above, a merging proxy creates a merged management message to a managed device by combining multiple different management messages (possibly from different managers) into one message using the same logic. Then, the merged message sent to the managed device consist, for example of <command, issuer, originator, [authenticator]> tuples (where authenticator is optional). The merging of multiple commands into one message may comprise multiple different commands, such that fewer messages are sent between the merging proxy node and a managed device, which can save resources.

In some embodiments, originator information may be received from a device manager with a command message, which the network node (proxy) then forwards, to a managed device. In a scenario where a network node (proxy) is able to be trusted, a device manager may simply issue a command to the network node (proxy), and wherein the network node then creates the originator information for a merged command message. This has an advantage in that legacy device managers that do not know or support a merging function can be used. The originator field can be created based on identity information that is used by a device manager during mutual authentication with a network node (proxy). Likewise, when a device sends a reply with receiver information, the network node (proxy) can send regular looking responses to the legacy device managers based on the receiver information in the response message from the managed device.

In the embodiments described above it is noted that, to provide optimized management for constrained devices, the steps of merging multiple commands may involve carrying out other smart actions, for example prioritization of multiple commands to the same managed device.

The embodiments of the present invention provide examples of solutions relating to how the security of management can be provided in a merging proxy scenario.

In the embodiments described above, it is noted that an MTC device message from a network node to a managed device may comprise information other than just command messages and their associated originator information. Likewise, in the embodiments described above, an MTC device message from a managed device to the network node may comprise information other than the response messages and their associated receiver information.

The embodiments have the advantage of providing the identities of the device managers to the constrained managed devices, which means that the managed devices can control access based on the identities of the actual device managers, since the identities are shown to the managed devices.

The embodiments have the advantage in that a merging proxy node does not need to maintain any access control information about the managed devices it is serving.

It is noted that although the various embodiments above refer to an MTC device sending one or more response messages relating to one or more previously issued commands from one or more device managers, it is noted that a response message may also comprise a message which is simply sent by an MTC device to one or more device managers, for example according to some predetermined rule, such as at periodic intervals, rather than in response to a particular command from a device manager(s).

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method in a network node of a communication network configured to manage command messages, from at least one Machine Type Communication (MTC) device manager, intended for an MTC device, the method comprising:
   receiving one or more command messages from the at least one MTC device manager;
   merging the one or more command messages into an MTC device message that comprises at least one command message;
   associating originator information with each command message in the MTC device message, wherein the originator information comprises information for identifying each MTC device manager that has issued a command message that forms a part of the MTC device message, and wherein associating the originator information with each command message in the MTC device message comprises passing access control of each command message in the MTC device message to the MTC device;
   adding authenticator information, received from the at least one MTC device manager, to the MTC device message, wherein the authenticator information is used for authenticating each MTC device manager that has issued the respective command message that forms the part of the MTC device message; and
   sending the MTC device message to the MTC device.

2. The method of claim 1, wherein the authenticator information comprises a keyed hash or a digital signature associated with each MTC device manager.

3. A method in a network node of a communication network configured to manage messages, from a Machine Type Communication (MTC) device, intended for at least one MTC device manager, the method comprising:
   receiving an MTC device message from the MTC device, the MTC device message comprising a response message, wherein the response message corresponds to a command message, wherein the MTC device message further comprises authenticator information relating to each MTC device manager that is identified as being authorized to receive the response message, and wherein the authenticator information comprises a public key of respective MTC device manager used for encryption of the response message;

determining from receiver information, contained in the MTC device message, which one or more MTC device managers are to receive the response message, wherein the determining comprises comparing the receiver information with originator information, associated with the command message, that is sent to the MTC device before receiving the MTC device message, wherein the association of the originator information with the command message comprises passing of access control of the command message to the MTC device, and wherein the originator information comprises information for identifying each MTC device manager that has issued the command message; and sending the response message to each of the determined one or more MTC device managers.

4. The method of claim 3, wherein the receiver information contains an identity of each MTC device manager which is authorized to receive the response message.

5. The method of claim 3, further comprising authenticating the MTC device manager prior to forwarding the response message to that MTC device manager.

6. A network node of a communication network configured to manage command messages, from at least one Machine Type Communication (MTC) device manager, intended for an MTC device, the network node comprising a processor and a memory containing instructions executable by said processor, wherein the network node is operative to:

receive one or more command messages from the at least one MTC device manager;

merge the one or more command messages into an MTC device message that comprises at least one command message;

associate originator information with each command message in the MTC device message, wherein the originator information comprises information for identifying each MTC device manager that has issued a command message that forms a part of the MTC device message, and wherein to associate the originator information with each command message in the MTC device message, the network node is operative to pass access control of each command message in the MTC device message to the MTC device;

add authenticator information, received from the at least one MTC device manager, to the MTC device message, wherein the authenticator information is used to authenticate each MTC device manager that has issued the respective command message that forms the part of the MTC device message; and send the MTC device message to the MTC device.

7. A Machine Type Communication (MTC) device for use in a communication network configured to manage messages between the MTC device and at least one MTC device manager, the MTC device comprising a processor and a memory containing instructions executable by said processor, wherein the MTC device is operative to:

receive an MTC device message from a network node, wherein the MTC device message comprises at least one command message from the at least one MTC device manager, the at least one command message having originator information associated therewith, wherein the association of the originator information with the at least one command message comprises passing of access control of the at least one command message to the MTC device, and wherein the MTC device message further comprises authenticator information;

determine, from the originator information, whether a command message is from at least one authorized MTC device manager, and in response to a determination that the command message is from the at least one authorized MTC device manager, perform the command message, wherein to determine from the originator information, the MTC device is further operative to:

use the originator information of an MTC device manager to obtain the authenticator information for that MTC device manager; and use the obtained authenticator information to verify the authenticator information received with the MTC device message, wherein the authenticator information comprises a key hash or a digital signature associated with the MTC device manager;

associate receiver information with a response message after performing the command message, to indicate which one or more MTC device managers are authorized to receive the response message; and encrypt the response message with a public key of the authorized one or more MTC device managers.

8. A Machine Type Communication (MTC) device manager for use in a communication network configured to manage messages between the MTC device manager and at least one MTC device via an intermediate node, the MTC device manager comprising a processor and a memory containing instructions executable by said processor, wherein the MTC device manager is operative to:

associate originator information and authenticator information with a command message wherein to associate the originator information with the command message, the MTC device manager is operative to pass access control of the command message to the at least one MTC device; and send the command message comprising the originator information and the authenticator information to the intermediate node, wherein the originator information identifies that the command message is issued by the MTC device manager, wherein the authenticator information is sent to the intermediate node to add the authenticator information with an MTC device message, and wherein the authenticator information is used to authenticate, by the intermediate node, the MTC device manager that has issued the command message that forms a part of the MTC device message.

9. The MTC device of claim 7, wherein the originator information, associated with the command message, indicates that multiple MTC device managers are associated with that command message.

10. The MTC device manager of claim 8, wherein the MTC device manager is further operative to associate the authenticator information with the command message such that the authenticator information: varies over time, or is cyclic, or is random, or includes a timestamp.

11. A network node of a communication network configured to manage messages, from a Machine Type Communication (MTC) device, intended for at least one MTC device manager, the network node comprising:

a memory; and a processor coupled to the memory, wherein the processor is configured to:

obtain an MTC device message transmitted by the MTC device, the MTC device message comprising a response message, wherein the response message corresponds to a command message, wherein the MTC device message further comprises authenticator information relating to each MTC device manager that is identified as being authorized to receive the response message, and wherein the authenticator information comprises a public key of respective MTC device manager used for encryption of the response message;

determine, from receiver information contained in the MTC device message, which one or more MTC device managers are to receive the response message, wherein, to determine from the receiver information, the processor is further configured to compare the receiver information with originator information, associated with the command message, that is sent to the MTC device before the MTC device message is obtained, wherein the association of the originator information with the command message comprises passing access control of the command message to the MTC device, and wherein the originator information comprises information for identifying each MTC device manager that has issued the command message; and send the response message to each of the determined one or more MTC device managers.

12. The method of claim 1, further comprising invalidating a command message received from another MTC device manager that has lower priority than the at least one MTC device manager and prioritizing the one or more command messages received from the at least one MTC device manager.

* * * * *